(12) United States Patent
Ahn et al.

(10) Patent No.: US 6,690,439 B2
(45) Date of Patent: Feb. 10, 2004

(54) MANUFACTURING METHOD OF CHOLESTERIC LIQUID CRYSTAL COLOR FILTER

(75) Inventors: Ji-Young Ahn, Gyeonggi-do (KR); Jong-Weon Moon, Seoul (KR)

(73) Assignee: LG. Philips LCD Co., Ltd., Seoul (KR)

(*) Notice: Subject to any disclaimer, the term of this patent is extended or adjusted under 35 U.S.C. 154(b) by 0 days.

(21) Appl. No.: 10/025,766

(22) Filed: Dec. 26, 2001

(65) Prior Publication Data

US 2002/0080324 A1 Jun. 27, 2002

(30) Foreign Application Priority Data

Dec. 26, 2000 (KR) .......................... 2000-81491

(51) Int. Cl.⁷ .................. G02F 1/1333; G02F 1/1335
(52) U.S. Cl. ................... 349/115; 349/93; 349/94; 349/124
(58) Field of Search .................. 349/115, 106, 349/124, 93, 94, FOR 121, 175, 133; 430/7

(56) References Cited

U.S. PATENT DOCUMENTS

| | | | | |
|---|---|---|---|---|
| 5,555,114 A | * | 9/1996 | Narita et al. ................ 349/98 |
| 6,133,980 A | * | 10/2000 | Faris ........................ 349/176 |
| 6,407,789 B1 | * | 6/2002 | Gibbons et al. ............. 349/124 |
| 2002/0101554 A1 | * | 8/2002 | Khan et al. ................ 349/133 |
| 2002/0132064 A1 | * | 9/2002 | Kwon et al. ................ 428/1.2 |

FOREIGN PATENT DOCUMENTS

JP   1999-0044736   6/1999

* cited by examiner

Primary Examiner—Jerome Jackson
Assistant Examiner—Matthew C. Landau
(74) Attorney, Agent, or Firm—McKenna Long & Aldridge LLP

(57) ABSTRACT

A method of manufacturing cholesteric liquid crystal (CLC) color filters in which an alignment treatment is accomplished simultaneously with a coloring process during a light exposure process using ultraviolet ray. Photochromic CLC is used for the cholesteric liquid crystal (CLC) and a photosensitive alignment material is used for an alignment layer.

22 Claims, 2 Drawing Sheets

MANUFACTURING METHOD OF CHOLESTERIC LIQUID CRYSTAL COLOR FILTER

This application claims the benefit of Korean Patent Application No. 2000-81491, filed on Dec. 26, 2000 in Korea, which is hereby incorporated by reference as if fully set forth herein.

BACKGROUND OF THE INVENTION

1. Field of the Invention

The present invention relates to a liquid crystal display (LCD) device and more particularly, to a method of manufacturing a cholesteric liquid crystal (CLC) color filter. The CLC color filter is often used in flat panel displays such as liquid crystal display devices.

2. Discussion of the Related Art

Thin film transistor liquid crystal display (TFT-LCD) devices are commonly used for liquid crystal display devices because of its superior reproduction of color images and thin size. The conventional thin film transistor liquid crystal display device includes an upper substrate (a color filter substrate) and a lower substrate (an array substrate) facing each other. A back light unit is located under the lower substrate in the conventional thin film transistor liquid crystal display devices. Because only about 7% of light irradiated from the back light unit reaches the display screen through liquid crystal cells, the back light unit needs to be brighter to obtain higher brightness for the liquid crystal display, which leads to a higher power consumption. Accordingly, batteries having large capacitance and heavy weight have been used to supply enough power to the back light unit. However, these batteries are still limited in terms of their duration time. To overcome the above-described problems, reflective type liquid crystal display devices have been considered. Because the reflective type liquid crystal display devices use ambient light for a light source, the power consumption of the back light unit can be decreased dramatically. Accordingly, the reflective type liquid crystal display devices are usually used for portable electronic devices such as a personal digital assistant (PDA) that can be driven for long hours.

A pixel region of the reflective type liquid crystal display device is made of an opaque reflector or an opaque reflective electrode, whereas the pixel region of a transmissive type liquid crystal display device is made of a transparent electrode. However, because the reflective type liquid crystal display device uses the ambient light for the light source, the brightness of the display is very low. The ambient light passes through the color filter substrate and is reflected by the reflective electrode on the lower substrate. Thereafter, the light passes through the color filter substrate again to display color images. The ambient light loses most of its brightness during its double passage through the color filter substrate. The transmittance characteristics of the color filter should be improved to overcome the low brightness problem in the reflective type liquid crystal display device. To this end, color purity needs to be lowered to increase the transmittance of the color filter. However, there is a limit to increasing the brightness by lowering the color purity.

Liquid crystal display devices using cholesteric liquid crystal (CLC), which selectively reflects or transmits an incident light, have been developed to improve the liquid crystal display devices. Generally, liquid crystal molecules have liquid crystal phase depending on the structure and composition of the liquid crystal molecules. The liquid crystal phase is affected by temperature and concentration. Nematic liquid crystal which has liquid crystal molecules regularly aligned in a certain direction, has been researched and applied widely in the liquid crystal display field. The nematic liquid crystal is commonly applied to liquid crystal display devices. The cholesteric liquid crystal (CLC) has twisted molecular axes or twisted directors of nematic liquid crystal from mixing the nematic liquid crystal with molecules having chiral characteristic, which means that a molecular structure of the liquid crystal does not superimpose on its mirror image. Generally, the nematic liquid crystal phase has regularity in that the liquid crystal molecules are aligned in a certain direction. On the other hand, the cholesteric liquid crystal (CLC) has a layered structure and the liquid crystal molecules in every layer show similar regularity to that of the nematic liquid crystal. However, the alignment of the liquid crystal molecules of each layer rotates in a certain direction, which can be clockwise or counterclockwise, and thus causing a difference in the reflectance between layers. A color can be displayed by a reflection and an interference of light that are caused by the difference in the reflectance between the layers. The rotations of the cholesteric liquid crystal (CLC) molecules form a helical structure. The two most important characteristics in the helical structure of the cholesteric liquid crystal (CLC) are rotational direction and pitch, i.e., period for 360 degrees rotation of the liquid crystal molecules. That is, the pitch can be understood as a distance between the first cholesteric liquid crystal (CLC) layer and the last cholesteric liquid crystal (CLC) layer when the cholesteric liquid crystal (CLC) molecules in the first cholesteric liquid crystal (CLC) layer rotate 360 degrees. The pitch is a parameter that decides the hue of the cholesteric liquid crystal (CLC). That is, if the pitch is the same as the wavelength of red color, i.e., 650 mn, the cholesteric liquid crystal (CLC) reflects the red color observed in the front direction. If the light reflected from the cholesteric liquid crystal (CLC) is observed in an angle to the plane of the color filter substrate, all colors such as yellow, green and blue, for example, which are included in a region of visible light, can be seen depending on the viewing angle. If the cholesteric liquid crystal (CLC) is used for flat display devices, which use transmission and scattering phenomenon to display images, a color image can be displayed using reflection and scattering phenomenon of a particular color. Another important characteristic in the helical structure of the cholesteric liquid crystal (CLC) is the rotational direction of the CLC helix. The rotational direction of the CLC helix is an important factor for the polarization phenomenon. That is, the direction of a circular polarization of the reflected light depends on whether the helix structure of the cholesteric liquid crystal (CLC) is right-handed or left-handed. The right-handed cholesteric liquid crystal (CLC) reflects a right circular polarization that has a wavelength corresponding to the pitch of the right-handed cholesteric liquid crystal (CLC). Because the ambient light is a mixture of a right circular polarization and a left circular polarization, the right circular polarization or the left circular polarization can be extracted according to the structure of the cholesteric liquid crystal (CLC), i.e., a right handed helix or left-handed helix. Because polarization property, i.e., a linear polarization, is used in the conventional liquid crystal display devices, the degree of light utilization will be greatly improved using the cholesteric liquid crystal (CLC), and will result in an effective reduction of power consumption compared to the color filters including pigment or dye.

The conventional manufacturing method of a cholesteric liquid crystal (CLC) color filter will be described hereinafter with reference to drawings attached herein. FIGS. 1A to 1D are cross-sectional views illustrating a conventional manufacturing sequence of a cholesteric liquid crystal (CLC) color filter.

In FIG. 1A, an alignment layer 10 is coated on a transparent substrate 1. A polyimide-based resin is usually used as the material for the alignment layer because it has excellent alignment characteristics with various liquid crystal materials and is suitable for the liquid crystal material. The coated alignment layer 10 then undergoes a heat-curing process.

In FIG. 1B, the surface of the alignment layer is rubbed by a rubbing fabric. The surface of the cured alignment layer is rubbed by the rubbing fabric in order to make scratches or grooves in a uniform direction. This rubbing process is needed in order to provide uniform alignment of the liquid crystal molecules and thus provide a display with uniform characteristics.

In FIG. 1C, the cholesteric liquid crystal (CLC) layer 14 is formed on the rubbed alignment layer 10. In FIG. 1D, the cholesteric liquid crystal (CLC) color filter 16 is formed through a light exposing process in which the pitch of the cholesteric liquid crystal (CLC) is controlled by light exposure, i.e., coloring. The cholesteric liquid crystal (CLC) can be classified into thermochromic CLC, monochromic CLC and photochromic CLC. The coloring method depends on these CLC types. Because a color of the thermochromic CLC depends on temperature, the cholesteric liquid crystal (CLC) color filter can be formed through an ultraviolet ray curing process when the color of the thermochromic CLC reaches a desired color by varying the temperature. The color of the cholesteric liquid crystal (CLC) means a color seen when the light is transmitted through the cholesteric liquid crystal (CLC) by controlling the pitch to correspond to a wavelength range of the desired color. Because the thermochromic CLC makes it possible to cure only desired portions of the thermochromic CLC using ultraviolet ray, it is easy to form a pattern. However, it is not easy to equip a light exposure apparatus for heating. The monochromic CLC shows only one color and thus it is not hard to equip a necessary apparatus because the temperature variation is unnecessary. However, because the patterning process using a photolithographic technique is needed in the case of the monochromic CLC, an extra process is required for the monochromic CLC. The photochromic CLC changes its color depending on light exposure degree of ultraviolet ray having a particular wavelength. Accordingly, an additional photolithographic process for patterning is not necessary here because the pattering process can be carried out by just controlling the degree of light exposure to desired portions of the photochromic CLC.

In the conventional manufacturing method of cholesteric liquid crystal (CLC) color filters, the rubbing process is carried out independently of the coloring process and accordingly, production yield is decreased because of an added process. In addition, electrical and mechanical defects caused by friction may occur during the rubbing process, which results in problems such as random phase distortion or light scattering.

SUMMARY OF THE INVENTION

Accordingly, the present invention is directed to a manufacturing method of cholesteric liquid crystal (CLC) color filters that substantially obviates one or more of problems due to limitations and disadvantages of the related art.

An advantage of the present invention is to provide a manufacturing method of cholesteric liquid crystal (CLC) color filter to increase a production yield and to lower a production cost.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of manufacturing cholesteric liquid crystal (CLC) color filters comprises forming an alignment layer on a transparent substrate, forming a cholesteric liquid crystal (CLC) layer on the alignment layer, controlling a pitch of a cholesteric liquid crystal (CLC) helix and forming an alignment treatment on the alignment layer simultaneously by irradiating the substrate with ultraviolet ray. The alignment layer is made of a photosensitive alignment material. Cholesteric liquid crystal (CLC) molecules have a helical structure and are photosensitive. The cholesteric liquid crystal (CLC) is a photochromic CLC.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1A:
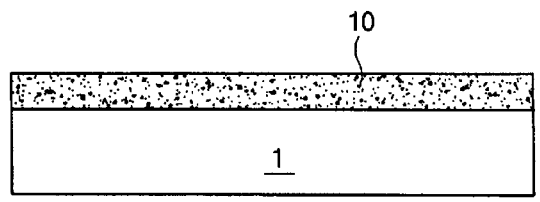
FIGS. 1A to 1D are cross-sectional views illustrating a conventional manufacturing sequence of a cholesteric liquid crystal (CLC) color filter.
Figure 1B:
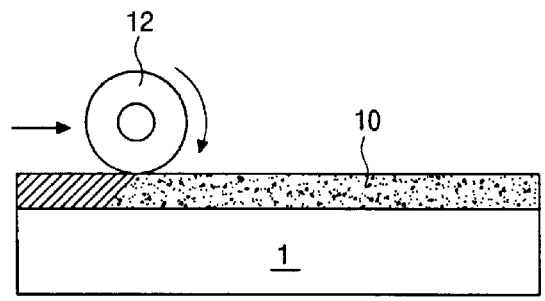
Figure 1C:
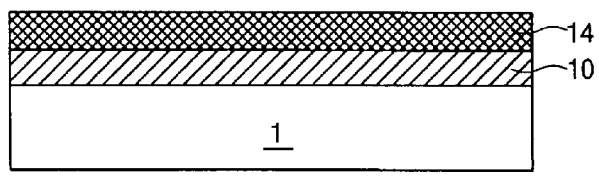
Figure 1D:
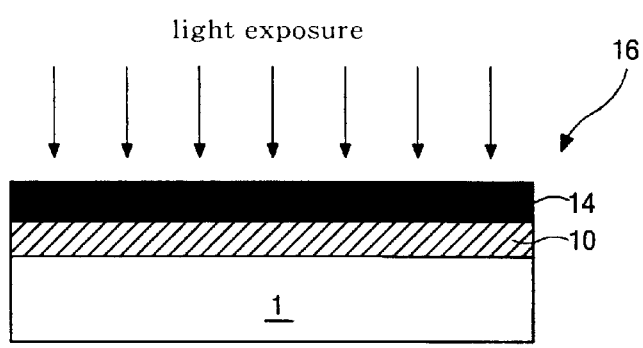
Figure 2A:
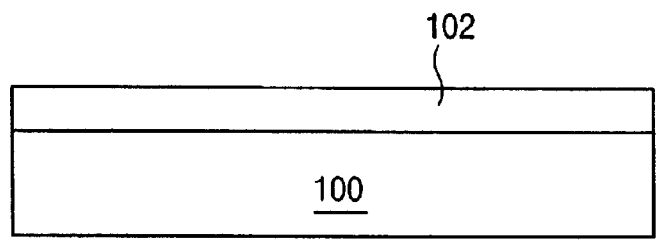
FIGS. 2A to 2C are cross-sectional views illustrating a manufacturing sequence of a cholesteric liquid crystal (CLC) color filter according to the present invention.
Figure 2B:
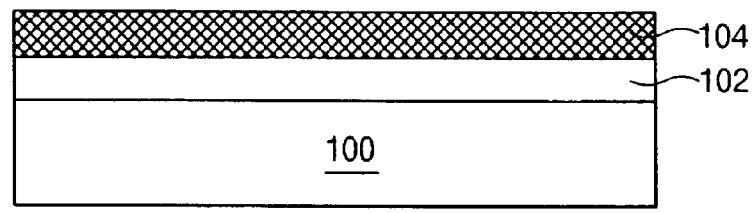
Figure 2C:
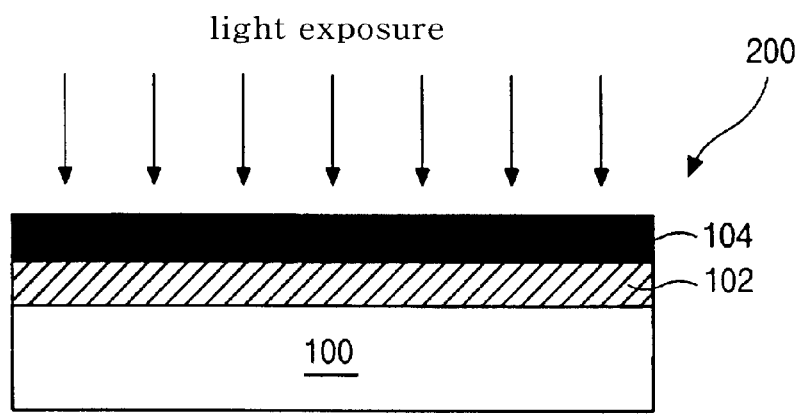

FIGS. 2A to 2C are cross-sectional views illustrating a manufacturing sequence of a cholesteric liquid crystal (CLC) color filter according to the present invention. In FIG. 2A, an alignment layer 102 is formed on a transparent substrate 100. The alignment layer 102 is formed, for example, by coating a photosensitive alignment material on the transparent substrate 100 and curing the coated photosensitive alignment material. Here, a rubbing process for an alignment treatment is unnecessary, which is usually carried out after forming the alignment layer. The photosensitive alignment material is a material that undergoes a chemical reaction when the material is exposed to light. A high molecular substance, i.e., polymer, such as polyvinyl cinnamate-based material (PVCN), polysiloxane cinnamate-based material (PSCN) and cellulose cinnamate-based material (CelCN), for example, which undergoes a chemical reaction such as decomposition, dimerization and isomerizaion, may be used for the photosensitive alignment material.

In FIG. 2B, the cholesteric liquid crystal (CLC) layer 104 is formed on the alignment layer 102 by coating. As described before, the alignment treatment process is not carried out before coating the cholesteric liquid crystal (CLC) 104 on the alignment layer 102. The cholesteric liquid crystal (CLC) 104 is a photochromic CLC in which a pitch of a helix of the cholesteric liquid crystal (CLC) can be freely controlled according to the degree of light exposure.

In FIG. 2C, the cholesteric liquid crystal (CLC) color filter 200 is formed by irradiating ultraviolet ray onto the cholesteric liquid crystal (CLC) layer 104 on the substrate 100. The coloring of the cholesteric liquid crystal (CLC) 104 and the alignment treatment of the alignment layer 102 are carried out at the same time during the light exposure process in which ultraviolet ray is used, for example, for the light exposure. That is, because the photosensitive alignment layer 102 under the cholesteric liquid crystal (CLC) layer 104 also reacts to the ultraviolet ray, the alignment treatment of the alignment layer 102 can be accomplished during the coloring process of the cholesteric liquid crystal (CLC) 104. Because the energy needed for the alignment e treatment is lower than the energy needed for the coloring of the cholesteric liquid crystal (CLC), the alignment treatment of the alignment layer 102 is first accomplished and then the coloring of the cholesteric liquid crystal (CLC) 104 is accomplished. The alignment treatment provides uniform alignment of the cholesteric liquid crystal (CLC) molecules and thus provides a display with uniform characteristics. Any kind of ultraviolet ray such as partially polarized ultraviolet ray and linearly polarized ultraviolet ray, for example, may be used for the present invention as long as the ultraviolet ray possesses enough energy to accomplish the coloring of the cholesteric liquid crystal (CLC) and the alignment treatment of the alignment layer at the same time during the light exposure.

Accordingly, the alignment treatment and coloring are carried out simultaneously in one process using, for example, a photochromic CLC and a photosensitive alignment layer material.

As described above in the embodiment of the present invention, the alignment treatment is accomplished simultaneously with the coloring process, while in the conventional manufacturing method for cholesteric liquid crystal (CLC) color filters, the rubbing process for alignment treatment is necessarily included. Thus, the present invention overcomes defects caused by friction during the rubbing process and reduces the number of steps in the manufacturing process, resulting in an increase in production yield and a decrease in production cost.

It will be apparent to those skilled in the art that varios modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A method of manufacturing cholesteric liquid crystal (CLC) color filters, comprising:

forming an alignment layer on a transparent substrate;

forming a cholesteric liquid crystal (CLC) layer on the alignment layer; and controlling a pitch of a cholesteric liquid crystal (CLC) helix and performing an alignment treatment on the alignment layer simultaneously by irradiating the substrate with ultraviolet ray.

2. The method according to claim 1, wherein the alignment layer includes a photosensitive alignment material.

3. The method according to claim 2, wherein the photosensitive material is selected from a polymer group consisting of polyvinyl cinnamate-based material (PVCN), polysiloxane cinnamate-based material (PSCN) and cellulose cinnamate-based material (CelCN).

4. The method according to claim 1, wherein cholesteric liquid crystal (CLC) molecules have a helical structure and are photosensitive.

5. The method according to claim 1, wherein the cholesteric liquid crystal (CLC) includes a photochromic CLC.

6. The method according to claim 1, wherein irradiating the substrate with the ultraviolet ray uses a first energy for controlling a pitch of a cholesteric liquid crystal helix and a second energy for performing an alignment treatment.

7. The method according to claim 6, wherein the second energy is lower than the first energy.

8. A method of manufacturing cholesteric liquid crystal (CLC) color filters, comprising:

forming an alignment layer on a substrate;

forming a cholesteric liquid crystal layer on the alignment layer; and irradiating the cholesteric liquid crystal layer with ultraviolet light for coloring, wherein irradiating the cholesteric liquid crystal layer also performs alignment treatment on the alignment layer.

9. The method according to claim 8, wherein the substrate includes a transparent material.

10. The method according to claim 8, wherein the alignment layer is formed by coating a photosensitive alignment material on the substrate.

11. The method according to claim 10, wherein the photosensitive alignment material is a material selected from the group consisting of polyvinyl cinnamate-based material (PVCN), polysiloxane cinnamate-based material (PSCN) and cellulose cinnamate-based material (CelCN).

12. The method according to claim 8, wherein a rubbing process for alignment treatment is not performed.

13. The method according to claim 8, wherein the cholesteric liquid crystal (CLC) layer includes a photochromic CLC.

14. The method according to claim 8, wherein the cholesteric liquid crystal layer has a pitch of a helix that can be controlled according to a degree of light exposure.

15. The method according to claim 8, wherein irradiating the cholesteric liquid crystal first performs the alignment treatment and then the cholesteric liquid crystal undergoes coloring.

16. The method according to claim 8, wherein an energy needed for the alignment treatment is lower than energy needed for cholesteric liquid crystal coloring.

17. The method according to claim 8, wherein the ultraviolet light includes partially polarized light.

18. The method according to claim 8, wherein the ultraviolet light includes linearly polarized light.

19. The method according to claim 8, wherein the ultraviolet light has an energy sufficient to accomplish cholesteric liquid crystal coloring and alignment treatment of the alignment layer during a single light exposure of the ultraviolet light.

20. A method of manufacturing cholesteric liquid crystal (CLC) color filters, comprising:

forming an alignment layer by coating a photosensitive alignment material on a substrate, the photosensitive alignment material being selected from the group consisting of polyvinyl cinnamate-based material (PVCN), polysiloxane cinnamate-based material (PSCN) and cellulose cinnamate-based material (CelCN);

forming a cholesteric liquid crystal layer on the alignment layer; and irradiating the cholesteric liquid crystal layer with ultraviolet light for coloring, wherein irradiating the cholesteric liquid crystal layer also performs alignment treatment on the alignment layer, wherein the cholesteric liquid crystal layer has a pitch of a helix that can be controlled according to a degree of light exposure of the ultraviolet light.

21. The method according to claim 20, wherein the cholesteric liquid crystal (CLC) layer includes a photochromic CLC.

22. The method according to claim 20, wherein the ultraviolet light includes one of a partially polarized light and a linearly polarized light.

\* \* \* \* \*